US008982996B2

(12) United States Patent
Choi et al.

(10) Patent No.: US 8,982,996 B2
(45) Date of Patent: Mar. 17, 2015

(54) COGNITIVE RADIO COMMUNICATION SYSTEM USING MULTIPLE INPUT MULTIPLE OUTPUT COMMUNICATION SCHEME

(75) Inventors: Hyun Ho Choi, Suwon-si (KR); Woongsup Lee, Daejeon (KR); Dong Ho Cho, Seoul (KR); Ohyun Jo, Cheongju-si (KR); Ki Song Lee, Hwaseong-si (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 1101 days.

(21) Appl. No.: 12/400,264

(22) Filed: Mar. 9, 2009

(65) Prior Publication Data
US 2009/0304110 A1 Dec. 10, 2009

(30) Foreign Application Priority Data

Jun. 10, 2008 (KR) .......................... 10-2008-0054096
Sep. 1, 2008 (KR) .......................... 10-2008-0085776

(51) Int. Cl.
H04L 27/00 (2006.01)
(52) U.S. Cl.
CPC ...................................... H04L 27/00 (2013.01)
USPC ......................................... 375/299; 375/295
(58) Field of Classification Search
CPC . H04W 16/14; H04W 72/085; H04W 72/082; H04W 84/08; H04L 27/006; H04L 1/0618
USPC ................. 375/260, 267, 299, 342, 347, 349; 370/210, 328, 329, 335, 342, 349, 278; 455/67.11, 67.13, 189.1, 425, 509; 367/39
See application file for complete search history.

(56) References Cited
U.S. PATENT DOCUMENTS 7,564,910 B2 * 7/2009 Kostic ............................ 375/260
7,715,343 B2 * 5/2010 Tomioka ........................ 370/329
7,965,641 B2 * 6/2011 Ben Letaief et al. ......... 370/237

(Continued)

FOREIGN PATENT DOCUMENTS

KR 10-2007-0048553 A 5/2007
KR 10-2007-0049091 A 5/2007
KR 10-2007-0109219 A 11/2007

OTHER PUBLICATIONS

K. Hamdi and K. B. Letaief, "Cooperative communications for cognitive radio networks," in Proc. PGNet 2007, Liverpool, UK, Jun. 2007.*

(Continued)

*Primary Examiner* — Daniel Washburn
*Assistant Examiner* — Fitwi Hailegiorgis
(74) *Attorney, Agent, or Firm* — NSIP Law

(57) ABSTRACT

A cognitive radio communication system using a multiple input multiple output (MIMO) communication technology is provided. A cognitive radio base station includes a plurality of antennas, a group setting unit to set at least one sensing terminal group that includes at least one sensing terminal among a plurality of terminals, and a signal generator to generate a transmission signal to transmit the transmission signal using channels formed between the plurality antennas and the plurality of terminals, so that the at least one sensing terminal is accorded a sensing time.

27 Claims, 12 Drawing Sheets

(56) References Cited

U.S. PATENT DOCUMENTS

| | | | |
|---|---|---|---|
| 2006/0229029 | A1 | 10/2006 | Waltho et al. |
| 2007/0091720 | A1* | 4/2007 | Woo et al. ................ 367/39 |
| 2007/0183392 | A1* | 8/2007 | Tandai et al. ............. 370/350 |
| 2007/0213046 | A1* | 9/2007 | Li et al. ................... 455/425 |
| 2007/0248076 | A1 | 10/2007 | Ji et al. |
| 2008/0002647 | A1* | 1/2008 | Laroia et al. .............. 370/338 |
| 2008/0166974 | A1* | 7/2008 | Teo et al. ................. 455/67.11 |
| 2008/0304404 | A1* | 12/2008 | Lu et al. ................... 370/210 |
| 2009/0088089 | A1* | 4/2009 | Chandra et al. ........... 455/101 |
| 2009/0135744 | A1* | 5/2009 | Chaudhri et al. .......... 370/278 |

OTHER PUBLICATIONS

Ganesan, G.; Ye Li; Bing, B.; Shaoqian Li; , "Spatiotemporal Sensing in Cognitive Radio Networks," Selected Areas in Communications, IEEE Journal on , vol. 26, No. 1, pp. 5-12, Jan. 2008.*

S. Haykin, "Cognitive radio: brain-enpowered wireless communications," IEEE Journal on Selected Areas in Communications, vol. 23, Feb. 2005.*

Rainer Schoenen, Josef Eichinger, and Bernhard H. Walke. "On the OFDMA FDD mode in 3G-LTE." Proc. of International OFDM-Workshop. 2007.*

Korean Office Action issued Jun. 26, 2014 in counterpart Korean Patent Application No. 10-2008-0085776 (10 pages, in Korean with English Translation).

Karama Hamdi and Khaled Ben Letaief "Cooperative Communications for Cognitive Radio Networks". Department of Electronic and Computer Engineering, The Hong Kong University of Science and Technology, Kowloon, Hong Kong, 2007 PGNet (5 pages).

* cited by examiner

COGNITIVE RADIO COMMUNICATION SYSTEM USING MULTIPLE INPUT MULTIPLE OUTPUT COMMUNICATION SCHEME

CROSS-REFERENCE TO RELATED APPLICATIONS

This application claims the benefit under 35 U.S.C. §119 (a) of a Korean Patent Application No. 10-2008-0054096, filed on Jun. 10, 2008, and a Korean Patent Application No. 10-2008-0085776, filed on Sep. 1, 2008, in the Korean Intellectual Property Office, the entire disclosure of which are incorporated herein by reference for all purposes.

BACKGROUND

1. Field

The following description relates to a cognitive radio communication system, and more particularly, to an apparatus and method of facilitating cooperation in a cognitive radio communication system.

2. Description of Related Art

Much research is currently underway involving technologies that efficiently use limited frequency resources. Cognitive radio technology is in the spotlight.

A cognitive radio communication system using the cognitive radio technology may recycle limited frequency resources to more efficiently use frequency resources. According to the cognitive radio technology, a secondary base station and a secondary terminal that belong to a secondary communication system may periodically or aperiodically sense radio resources used in a primary communication system, recognize an available frequency resource, and transmit and receive data using the recognized available frequency resource.

However, a primary base station and a primary terminal in the primary communication system may have priority with respect to the available frequency band. Accordingly, where a signal of the secondary communication system may collide with a signal of the primary communication system, the secondary base station and the secondary terminal may need to suspend the communication operations or change a frequency resource to another frequency resource.

Attention is also being paid to a multiple input multiple output (MIMO) communication system that performs communications using a plurality of channels. It is possible to achieve a diversity gain by forming a plurality of channels between users and a plurality of antennas of a base station in the MIMO communication system.

Where a secondary communication system using a cognitive radio technology is a MIMO communication system, there is a need to bring together the MIMO communication technology and the cognitive radio technology.

SUMMARY

In one general aspect, a cognitive radio base station includes a plurality of antennas, a group setting unit to set at least one sensing terminal group that includes at least one sensing terminal among a plurality of terminal, and a signal generator to generate a transmission signal to transmit the transmission signal using channels formed between the plurality antennas and the plurality of terminals, so that the at least one sensing terminal is accorded a sensing time.

The signal generator may generate the transmission signal so that a signal received by the at least one sensing terminal is null or near-null.

The plurality of antennas may simultaneously transmit the transmission signal for the at least one sensing terminal and at least one remaining terminal excluding the at least one sensing terminal.

Where the at least one sensing terminal group includes a plurality of subsets, the signal generator may generate the transmission signal so that a signal received by the at least one sensing terminal belonging to the plurality of subsets is null or near-null.

The group setting unit may recognize the existence of a primary user and set the at least one sensing terminal group that includes the at least one sensing terminal, based on a location of the primary user.

The group setting unit may set the at least one sensing terminal group that includes the at least one sensing terminal based on a distance between a primary user and the plurality of terminals.

The at least one sensing terminal belonging to the at least one sensing terminal group may sense a signal of a primary user while receiving the transmission signal.

The at least one sensing terminal belonging to the plurality of subsets may sense a signal of a primary user.

The cognitive radio base station may further include a band controller to adaptively control a downlink band and an uplink band so that a usage frequency band of a primary user may be included in the downlink band, in a cognitive radio communication system that adopts a frequency division duplex scheme separately using the downlink band and the uplink band, wherein the at least one sensing terminal belonging to the at least one sensing terminal group senses a signal of the primary user using the controlled downlink band while receiving the transmission signal.

The at least one sensing terminal may report a sensing result regarding the signal of the primary user using the controlled uplink band.

At least one terminal among the plurality of terminals may recognize the existence of the primary user according to a fast sensing scheme, and the group setting unit may receive information associated with the existence of the recognized primary user from the at least one terminal among the plurality of terminals.

In another aspect, a cognitive ratio base station includes a group setting unit to set at least one sensing terminal group that includes at least one sensing terminal to perform a fine sensing among a plurality of terminals, and an uplink communication terminal decision unit to determine at least one uplink communication terminal to perform an uplink communication among the plurality of terminals, so that the at least one sensing terminal is accorded a sensing time in an uplink time interval.

The uplink communication terminal decision unit may determine the at least one uplink communication terminal based on at least one of a transmission power of the terminals, a location of the at least one sensing terminal, locations of the terminals, and a tolerable threshold of interference occurring in the at least one sensing terminal due to the plurality of terminals.

The uplink communication terminal decision unit may determine the at least one uplink communication terminal based on interference occurring in the at least one sensing terminal due to the at least one uplink communication terminal.

The group setting unit may set the at least one sensing terminal group based on a distance between a primary user and the plurality of terminals.

At least one terminal among the plurality of terminals may recognize the existence of the primary user according to a fast sensing scheme, and the group setting unit may set the at least one sensing terminal group based on information associated with the existence of the primary user.

The cognitive radio base station may further include an information provider to provide the plurality of terminals with information associated with the determined at least one uplink communication terminal.

The remaining terminals excluding the determined at least one uplink communication terminal among the plurality of terminals may not perform the uplink communication in the uplink time interval, based on information associated with the determined at least one uplink communication terminal.

In still another aspect, a method of operating a sensing terminal among a plurality of cognitive radio terminals, includes recognizing by the sensing terminal the existence of a primary user according to a fast sensing scheme to report to a cognitive radio base station information associated with the existence of the primary user, and sensing by the sensing terminal a signal of the primary user while the cognitive radio base station transmits a transmission signal, wherein the cognitive radio base station transmits the transmission signal via a plurality of antennas, so that the sensing terminal is accorded a sensing time.

The cognitive radio base station may transmit the transmission signal, so that a signal received by the sensing terminal is null or near-null, and at least one remaining terminal excluding the sensing terminal among the plurality of cognitive radio terminals receives data.

The sensing may include sensing the signal of the primary user according to a fine sensing scheme.

In yet another aspect, a method of operating a cognitive radio base station, includes setting by the cognitive radio base station at least one sensing terminal group that includes at least one sensing terminal among a plurality of terminals, generating by the cognitive radio base station a transmission signal to transmit the transmission signal using channels formed between a plurality of antennas and the plurality of terminals, so that the at least one sensing terminal is accorded a sensing time, and transmitting by the cognitive radio base station the transmission signal to the plurality of terminals via the plurality of antennas.

The generating may include generating the transmission signal so that a signal received by the at least one sensing terminal is null or near-null and at least one remaining terminal excluding the at least one sensing terminal receives data, and the transmitting may include transmitting the transmission signal to the at least one sensing terminal and the at least one remaining terminal.

The at least one sensing terminal may sense a signal of a primary user while receiving the transmission signal.

In still yet another aspect, a method of operating a cognitive radio base station, includes setting by the cognitive radio base station at least one sensing terminal group that includes at least one sensing terminal to perform a fine sensing among a plurality of terminals, and determining by the cognitive radio base station at least one uplink communication terminal to perform an uplink communication among the plurality of terminals, so that the at least one sensing terminal is accorded a sensing time in an uplink time interval.

The determining may include determining the at least one uplink communication terminal based on at least one of a transmission power of the terminals, a location of the at least one sensing terminal, locations of the terminals, and a tolerable threshold of interference occurring in the at least one sensing terminal due to the plurality of terminals.

Other features will become apparent to those skilled in the art from the following detailed description, which, taken in conjunction with the attached drawings, discloses exemplary embodiments.

BRIEF DESCRIPTION OF THE DRAWINGS

Throughout the drawings and the detailed description, unless otherwise described, the same drawing reference numerals refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, description of well-known functions and constructions may be omitted for increased clarity and conciseness.

Figure 1:
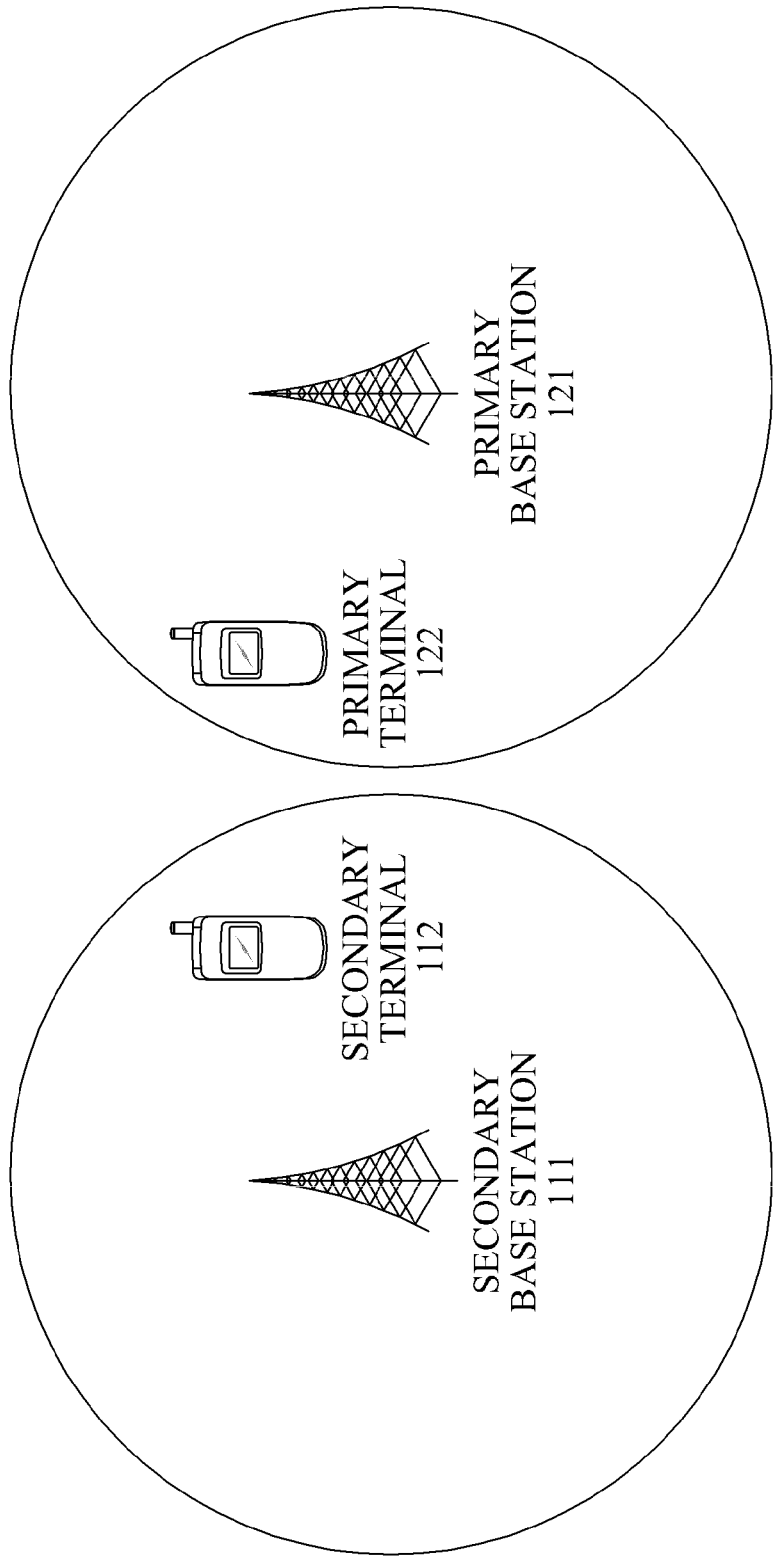
FIG. 1 is a diagram illustrating an exemplary primary communication system and an exemplary secondary communication system.

FIG. 1 illustrates an exemplary primary communication system 120 and an exemplary secondary communication system 110.

As illustrated in FIG. 1, the secondary communication system 110 includes a secondary base station 111 and a secondary terminal 112. The primary communication system 120 includes a primary base station 121 and a primary terminal 122.

Using the cognitive radio technology, the secondary communication system 110 may recognize an available radio resource among radio resources allocated to the primary communication system 120. Data may be transmitted and received between the secondary base station 111 and the secondary terminal 112 of the secondary communication system 110, using the recognized available radio resource.

A collision may occur where the primary communication system 120 and the secondary communication system 110 use the same radio resource. Generally, the primary communication system 120 has a priority over the secondary communication system 110 with respect to the radio resources allocated to the primary communication system 120.

Accordingly, the secondary communication system 110 may use all or a portion of the radio resources allocated to the primary communication system 120 under a condition that the secondary communication system 110 does not interrupt the communication operations of the primary communication system 120. The secondary base station 111 and the secondary terminal 112 of the secondary communication system 110 may sense a signal of the primary communication system 120. Where the signal of the primary system 120 does not exist, the secondary base station 111 and the secondary terminal 112 may use the available radio resources.

Figure 2:
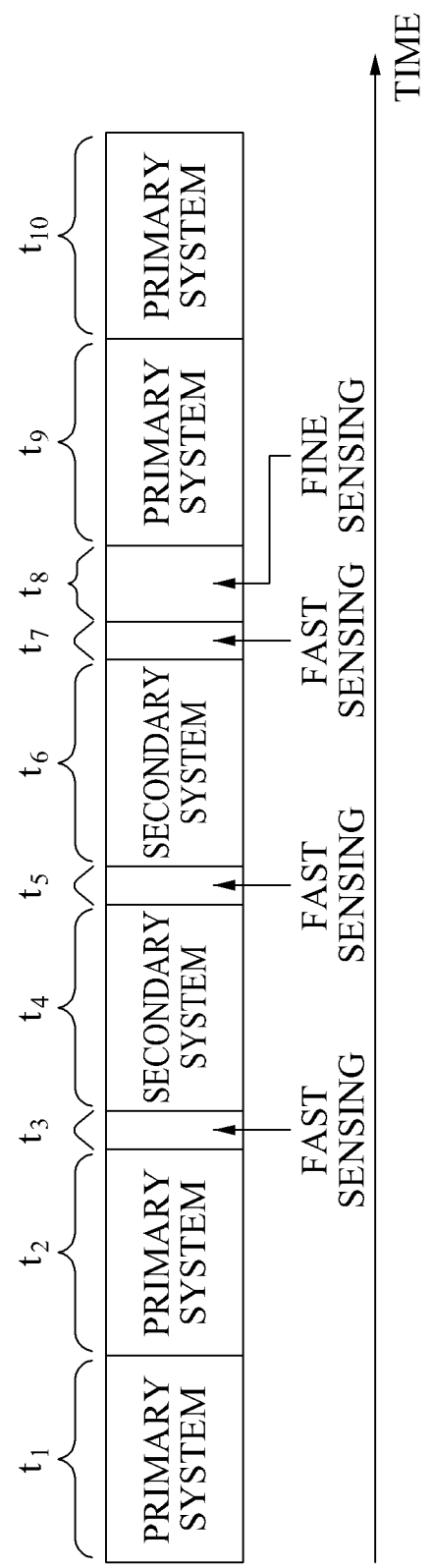
FIG. 2 is a diagram illustrating an operation of a primary communication system and a secondary communication system with respect to using radio resources over time according to an exemplary embodiment.

FIG. 2 illustrates an operation of a primary communication system and a secondary communication system with respect to using radio resources over time according to an exemplary embodiment.

Referring to FIG. 2, the primary communication system may use a radio resource in time intervals $t_1$ and $t_2$.

In a time interval $t_3$, the secondary communication system may perform a fast sensing regarding whether the primary communication system is using the radio resource. Generally, fast sensing time intervals $t_3$, $t_5$, and $t_7$ are shorter than a fine sensing time interval $t_8$. The secondary communication system may perform a fast sensing for a predetermined period of time.

The secondary communication system may receive a signal of the primary communication system in the fast sensing time interval and compare the power or energy of the received signal to a predetermined reference level. Accordingly, the secondary communication system may quickly determine whether the signal of the primary communication system exists.

Where the secondary communication system performs a fast sensing in the time intervals $t_3$ and $t_5$, and determines that the signal of the primary communication system does not exists, that is, the primary communication system is not using the radio resource, the secondary communication system may use the radio resource allocated to the primary communication system in time intervals $t_4$ and $t_6$.

The secondary communication system may perform a fast sensing in the time interval $t_7$. Where the secondary communication system determines that the signal of the primary communication system exists, the secondary communication system may perform a fine sensing during the fine sensing time interval $t_8$. In this case, the secondary communication system may more accurately determine whether the signal of the primary communication system exists during the fine sensing time interval $t_8$. For example, the secondary communication system may determine whether the received signal is the signal of the primary communication system using a matched filter and the like.

Where the secondary communication system performs a fine sensing and determines that the signal of the primary communication system exists, the secondary communication system may suspend the use of the radio resource in order to prevent a collision with the primary communication system. Accordingly, the primary communication system may use the radio resource in time intervals $t_9$ and $t_{10}$.

Generally, the secondary communication system may avoid the aforementioned collision with the primary communication system. However, even where the signal of the primary communication system exists, the secondary communication system may erroneously determine that the signal of the primary communication system does not exist. Also, even where the signal of the primary communication system does not exist, the secondary communication system may erroneously determine that the signal of the primary communication system does exist. Here, a probability of the second communication system erroneously determining that the signal of the primary communication system does not exist when in fact the signal of the primary communication system does exist is referred to as a missed detection probability. A probability of the second communication system erroneously determining that the signal of the primary communication system does exist when in fact the signal of the primary communication system does not exist is referred to as a false alarm probability.

When the secondary communication system is performing the fine sensing, the secondary communication system may be unable to perform data communication. For example, during a fine sensing time interval, a secondary base station and secondary terminals of the secondary communication system may suspend the data communication so as to more accurately detect the signal of the primary communication system. The fine sensing time or time where the data communication is suspended is referred to as a "quiet time."

Inefficiency may result because the fine sensing time interval is generally longer than the fast sensing time interval, and time is wasted during the quiet time. Accordingly, according to an exemplary embodiment, the quiet time may not be required or may be reduced. Hereinafter, a time required by the secondary base station or the secondary terminals in order to sense the signal of the primary communication system, for example, a "quiet time" is referred to as a "sensing time."

A cognitive radio communication system according to an exemplary embodiment may generate a transmission signal using a multiple input multiple output (MIMO) communication technology, so that a signal received by a sensing terminal may become null or near-null, whereby the sensing terminal may have a virtual sensing time. Accordingly, the sensing terminal may perform a fine sensing using the virtual sensing time and may not require a separate physical sensing time for the fine sensing. Thus, the capacity of the cognitive radio communication system may be increased.

Figure 3:
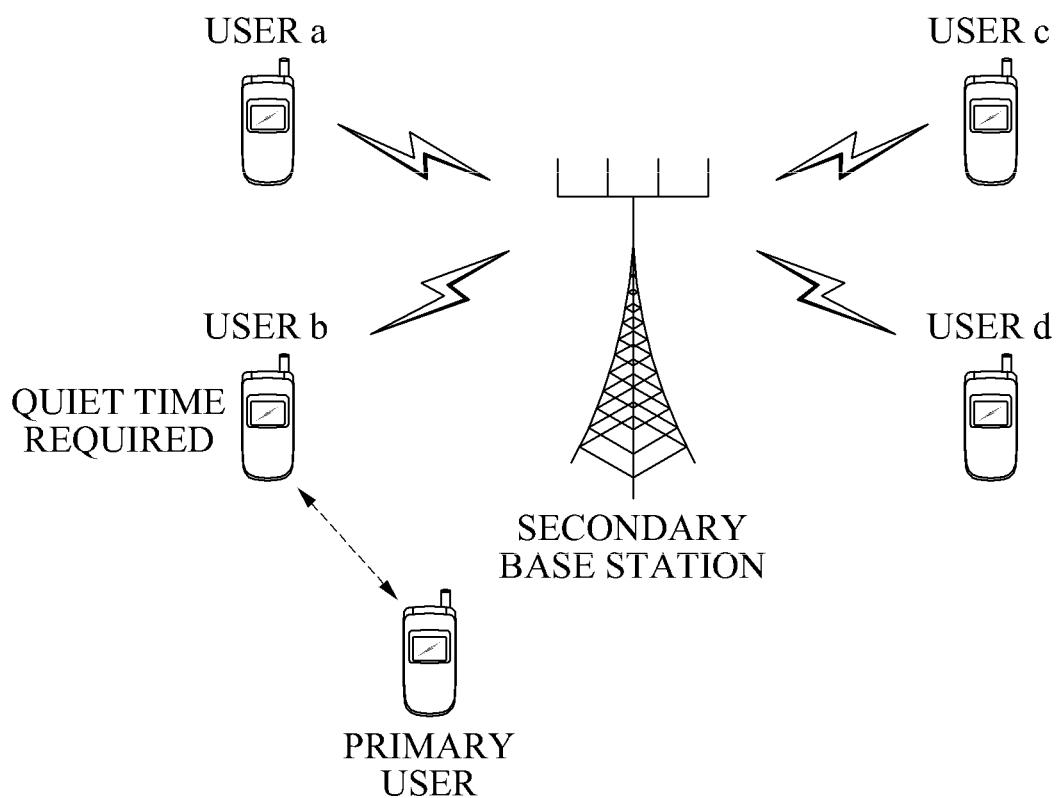
FIG. 3 is a diagram illustrating a primary user, secondary users, and a secondary base station having a plurality of antennas according to an exemplary embodiment.

FIG. 3 illustrates a primary user, secondary users, and a secondary base station having a plurality of antennas according to an exemplary embodiment.

Referring to FIG. 3, the secondary base station includes the plurality of antennas. The secondary base station may communicate with the secondary terminals (USERS a, b, c, and d) via the plurality of antennas.

A plurality of radio channels may be formed between the plurality of antennas of the secondary base station and the secondary terminals (USERS a, b, c, and d). A transmission signal may be transferred from the secondary base station to the secondary terminals (USERS a, b, c, and d) via the plurality of antennas.

FIG. 3 further illustrates a case where the primary user appears around the USER b. The USER b may recognize the existence of the primary user according to a fast sensing scheme and more accurately sense a signal of the primary user according to a fine sensing scheme.

Where the USER b receives a signal from the secondary base station while performing a fine sensing, the USER b may not appropriately perform the fine sensing. Therefore, the secondary base station may not transmit the transmission signal to any of the users during the fine sensing.

Also, a quiet time may be required for the USER b to perform the fine sensing. Where all the users have the quiet time in order to perform the fine sensing of the signal of the primary user, time resources may be wasted. Accordingly, it may be effective to have only the USER b adjacent to the primary user among the plurality of USERS a, b, c, and d perform the fine sensing, using the quiet time, while the remaining USERS a, c, and d excluding the USER b perform a data communication.

A secondary base station according to an exemplary embodiment may recognize radio channels between the secondary base station and the plurality of the users and transmit a transmission signal by appropriately using the radio channels, so that a signal received by the USER b may become null or near-null and the remaining USERS a, c, and d may practically receive data. In this case, although the secondary base station transmits the transmission signal while the USER b performs the fine sensing, the signal received by the USER b may become null or near-null and thus the USER b may have the virtual sensing time. Accordingly, the USER b may appropriately perform the fine sensing using the virtual sensing time. The remaining USERS a, c, and d may seamlessly receive data from the secondary base station without wasting time resources.

Figure 4:
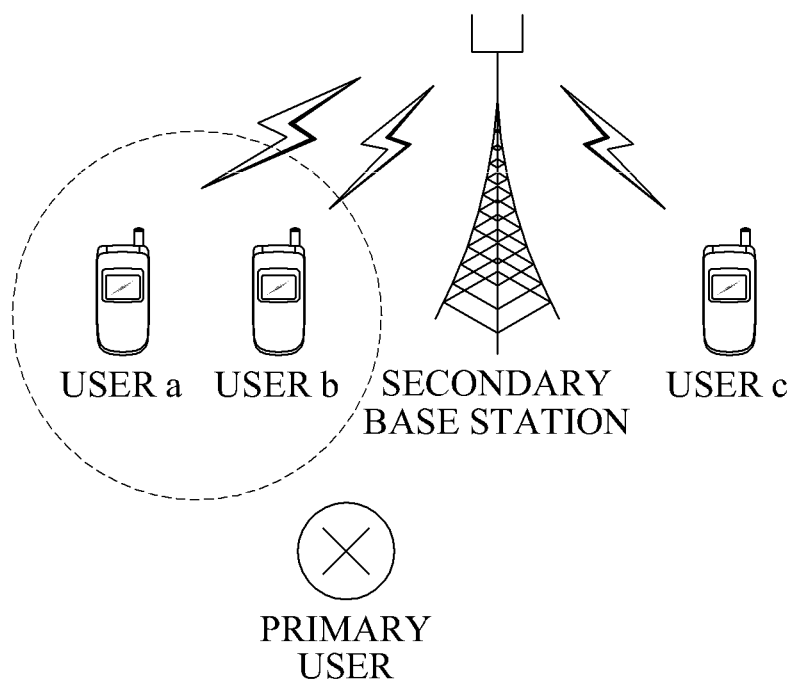
FIG. 4 is a diagram illustrating an exemplary sensing terminal group.

FIG. 4 illustrates an exemplary sensing terminal group.

Referring to FIG. 4, a secondary base station may communicate with a plurality of secondary terminals (USERS a, b, and c).

Where a primary user appears, two or more terminals may perform a fine sensing for a signal of the primary user. For example, the USERS a and b adjacent to a location of the primary user may act as sensing terminals and be grouped as a sensing terminal group. It is understood that terminals having a predetermined location with respect to a location of the primary user may act as sensing terminals.

Where the secondary base station transmits a transmission signal, a signal received by the USERS a and b may become null or near-null, and the USERS a and b may have a virtual sensing time. The USER c may receive the transmission signal from the secondary base station.

Figure 5:
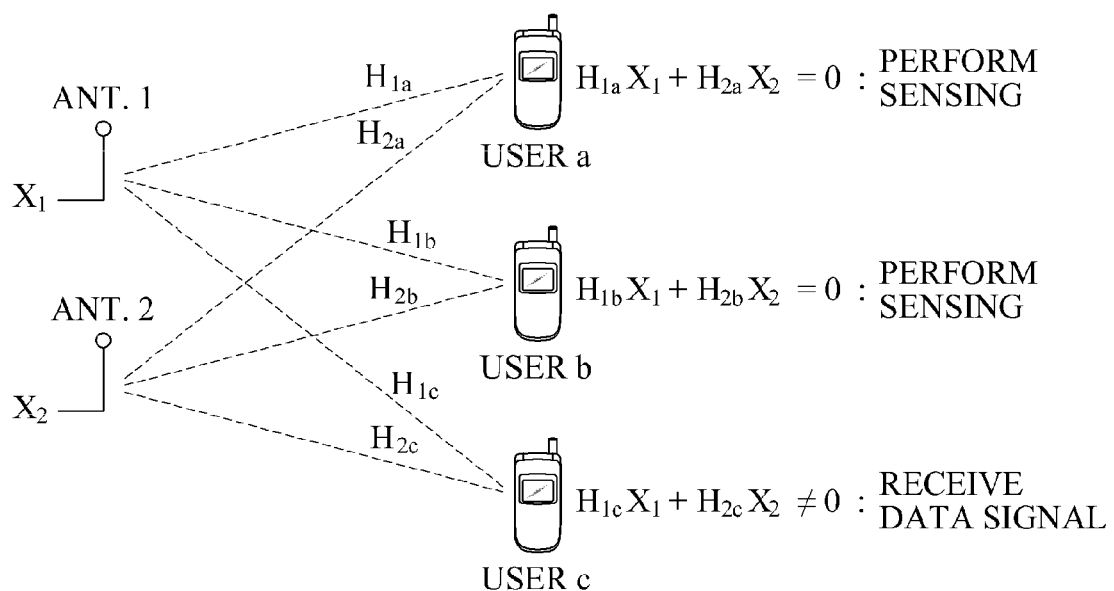
FIG. 5 is a diagram illustrating transmission of transmission signals and signals received by users according to an exemplary embodiment.

FIG. 5 illustrates transmission of transmission signals and signals received by users according to an exemplary embodiment.

Referring to FIG. 5, a secondary base station (not shown) may transmit transmission signals $X_1$ and $X_2$ to USERS a, b, and c via two antennas ANT. 1 and ANT. 2.

A plurality of radio channels may be formed between the two antennas ANT. 1 and ANT. 2, and the USERS a, b, and c. In FIG. 5, $H_{nk}$ denotes a channel that is formed between ANT. N (1 or 2) and the USER k (a, b, or c).

Here, it is assumed that the USERS a and b are located adjacent to a primary user and are included in the same sensing terminal group as sensing terminals.

The secondary base station may generate the transmission signals $X_1$ and $X_2$ so that the signals received by the sensing terminals, that is, the USERS a and b may become null or near-null. The secondary base station may simultaneously transmit the transmission signals $X_1$ and $X_2$ to the USERS a, b, and c.

A signal $r_a$ received by the USER a and a signal $r_b$ received by the USER b may be expressed by the following Equation 1:

$$r_a = H_{1a}X_1 + H_{2a}X_2 = 0$$

$$r_b = H_{1b}X_1 + H_{2b}X_2 = 0 \qquad (1).$$

Referring to the above Equation 1, both the signal $r_a$ received by the USER a and the signal $r_b$ received by the USER b are zero. For example, although the secondary base station seamlessly transmits the transmission signals $X_1$ and $X_2$, $r_a$ and $r_b$ may become zero. Accordingly, the USERS a and b may have the virtual sensing time or the quiet time. While the secondary base station transmits the transmission signals $X_1$ and $X_2$, the USERS a and b corresponding to the sensing terminals may not practically receive any signals from the secondary base station, and thus may more accurately perform the fine sensing.

The USER c may extract data from the transmission signals $X_1$ and $X_2$. For example, a signal $r_c$ received by the USER c may be expressed by the following Equation 2:

$$r_c = H_{1c}X_1 + H_{2c}X_2 \qquad (2).$$

Since the signal $r_c$ received by the USER c does not become "zero," the USER c may detect data from the signal $r_c$.

In a cognitive radio communication system according to an exemplary embodiment, a sensing terminal performs a fine sensing and the remaining terminals excluding the sensing terminal perform a data communication. Accordingly, a separate physical sensing time or quiet time to perform the fine sensing may not be required and thus the data communication may not be suspended throughout the entire cognitive radio communication system.

Figure 6:
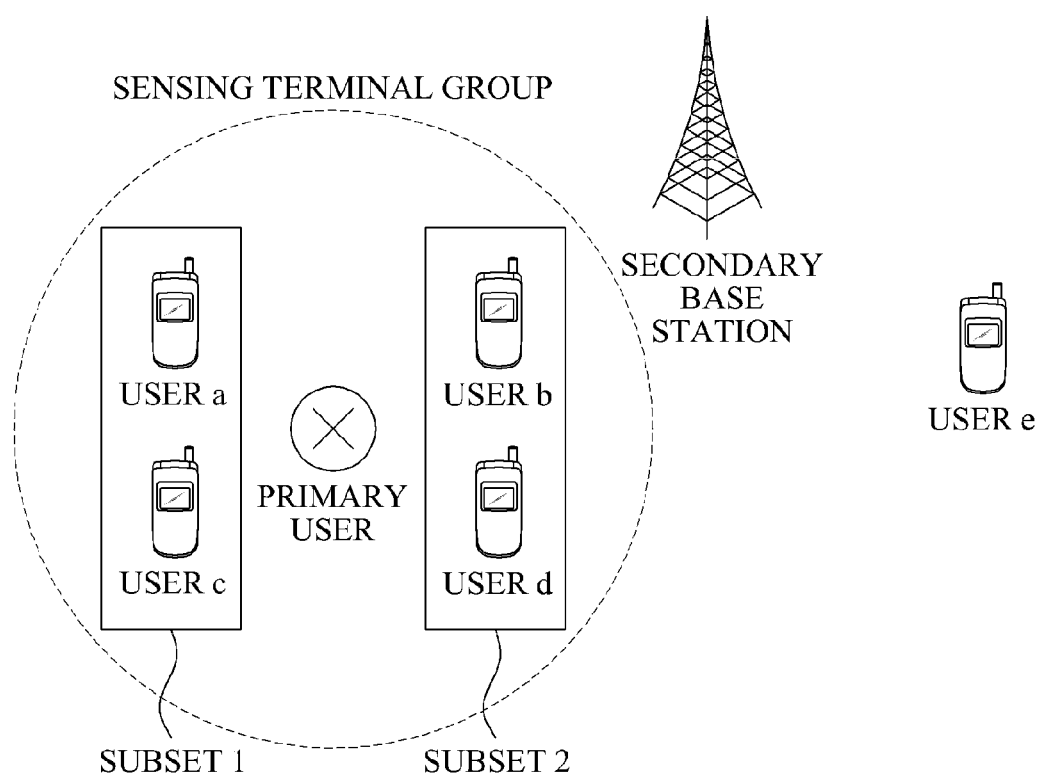
FIG. 6 is a diagram illustrating an exemplary sensing terminal group having a plurality of subsets.

FIG. 6 illustrates an exemplary sensing terminal group having a plurality of subsets.

Referring to FIG. 6, the sensing terminal group may include two subsets.

Where a plurality of users is located adjacent to a primary user, users adjacent to a location of the primary user may be grouped into the sensing terminal group. A number of users of which received signals are null or near-null may be limited by a number of antennas installed in a secondary base station, a radio channel state, and the like.

Here, it is assumed that the sensing terminal group includes four users, USERS a, b, c, and d, and the number of users of which received signals are null or near-null may be less than or equal to 2. As shown in FIG. 6, the sensing terminal group may include a subset 1 including the USERS a and c and a subset 2 including the USERS b and d.

The secondary base station may transmit a transmission signal for the USERS a and c of the subset 1 and a USER e via a plurality of antennas. In this case, the signal received by the USERS a and c may become null or near-null and the USER e may extract data from the transmission signal. While the secondary base station transmits the transmission signal, that is, in a virtual sensing time interval, the USERS a and c may perform a fine sensing for a signal of the primary user.

While the secondary base station transmits the transmission signal for the USERS b and d of the subset 2 and the USER e, the USERS b and d may perform a fine sensing and the USER e may perform a data communication.

Figure 7:
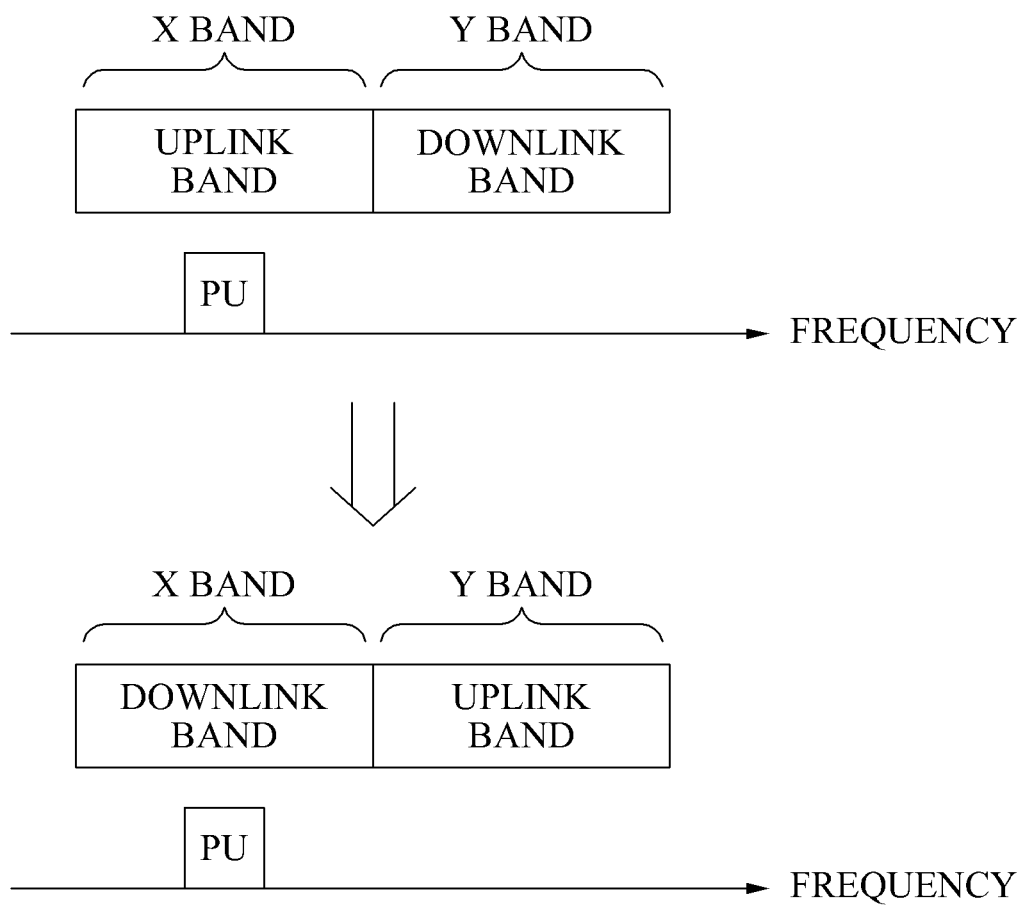
FIG. 7 is a diagram illustrating an example of a downlink band and an uplink band according to an exemplary embodiment.

FIG. 7 illustrates an example of a downlink band and an uplink band according to an exemplary embodiment.

Referring to FIG. 7, a frequency division duplex scheme may be utilized by a cognitive radio communication system. A frequency band used in the cognitive radio communication system may be classified into a downlink band and an uplink band.

As described above with reference to FIGS. 1 through 6, a fine sensing may be generally performed in the downlink band. For example, where a secondary base station transmits a transmission signal using the downlink band, users may need to perform a fine sensing for a signal of a primary user in the downlink band.

As shown in FIG. 7, it is assumed that the uplink band is initially determined as X band and the downlink band is determined as Y band. Where a frequency of the signal of the primary user belongs to the uplink band, that is, the X band, a fine sensing may not be appropriately performed.

However, where the frequency of the signal of the primary user belongs to the uplink band, that is, the X band, the secondary base station may change the X band to the downlink band. For example, the secondary base station may adaptively control the downlink band and the uplink band so that a usage frequency band of the primary user may be included in the downlink band. Since the usage frequency band of the primary user may be controlled to be included in the downlink band of the cognitive radio communication system, the secondary base station or secondary terminals may sense the signal of the primary user with respect to the controlled downlink band to more accurately sense the signal of the primary user.

Figure 8:
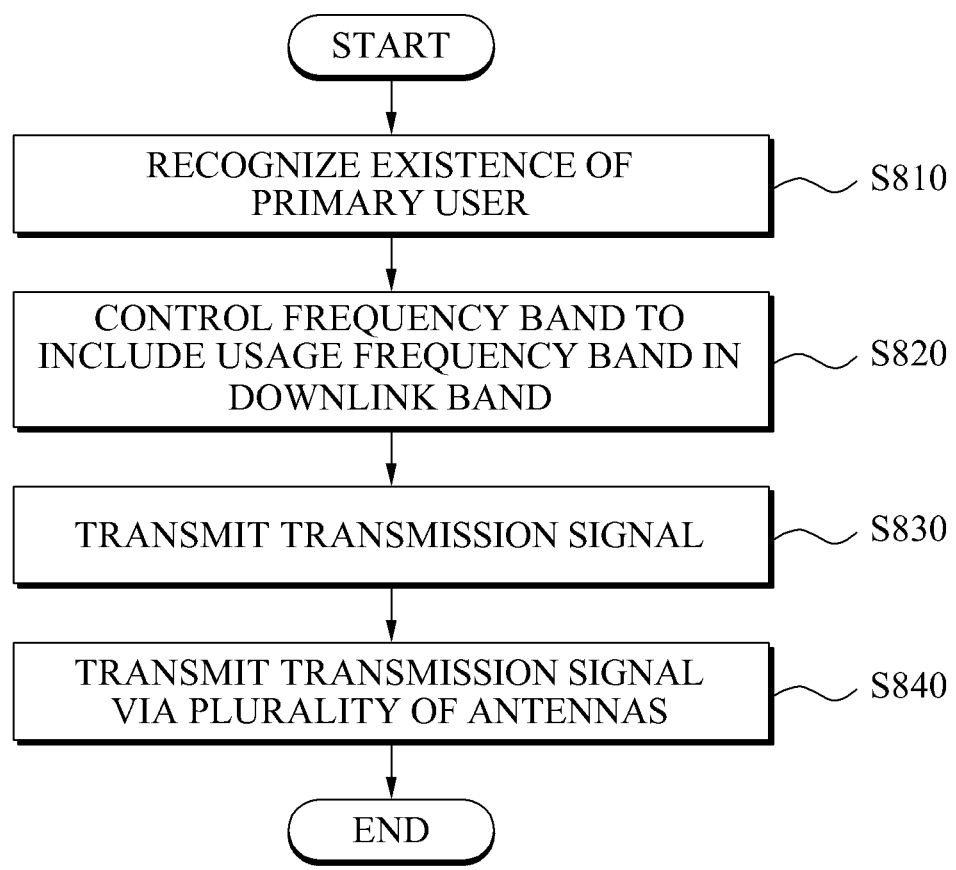
FIG. 8 is a flowchart illustrating an exemplary method of operating a cognitive radio base station.

FIG. 8 illustrates an exemplary method of operating a cognitive radio base station.

Referring to FIG. 8, in operation S810, a cognitive radio base station according to an exemplary embodiment may recognize the existence of a primary user. For example, at least one cognitive radio terminal among a plurality of cognitive radio terminals may recognize the existence of the primary user via a fast sensing scheme and report to the cognitive radio base station about information associated with the existence of the primary user. The cognitive radio base station may identify the existence and a location of the primary user based on the information.

In operation S820, the cognitive radio base station may control a downlink band and an uplink band so that a usage frequency band of the primary user may be included in the downlink band.

In operation S830, the cognitive radio base station may generate a transmission signal using channels formed between a plurality of antennas and the plurality of terminals, so that a signal received by the at least one sensing terminal may become null and at least one remaining terminal excluding the at least one sensing terminal may receive data.

In operation S840, the cognitive radio base station may, for example, simultaneously transmit the transmission signal for the at least one sensing terminal and the at least one remaining terminal via the plurality of antennas.

While receiving the transmission signal, the at least one sensing terminal may perform a fine sensing for the signal of the primary user. The at least one remaining terminal may normally perform a data communication.

Although not shown in FIG. 8, while the cognitive radio base station transmits the transmission signal, a signal of the primary user may be sensed.

Figure 9:
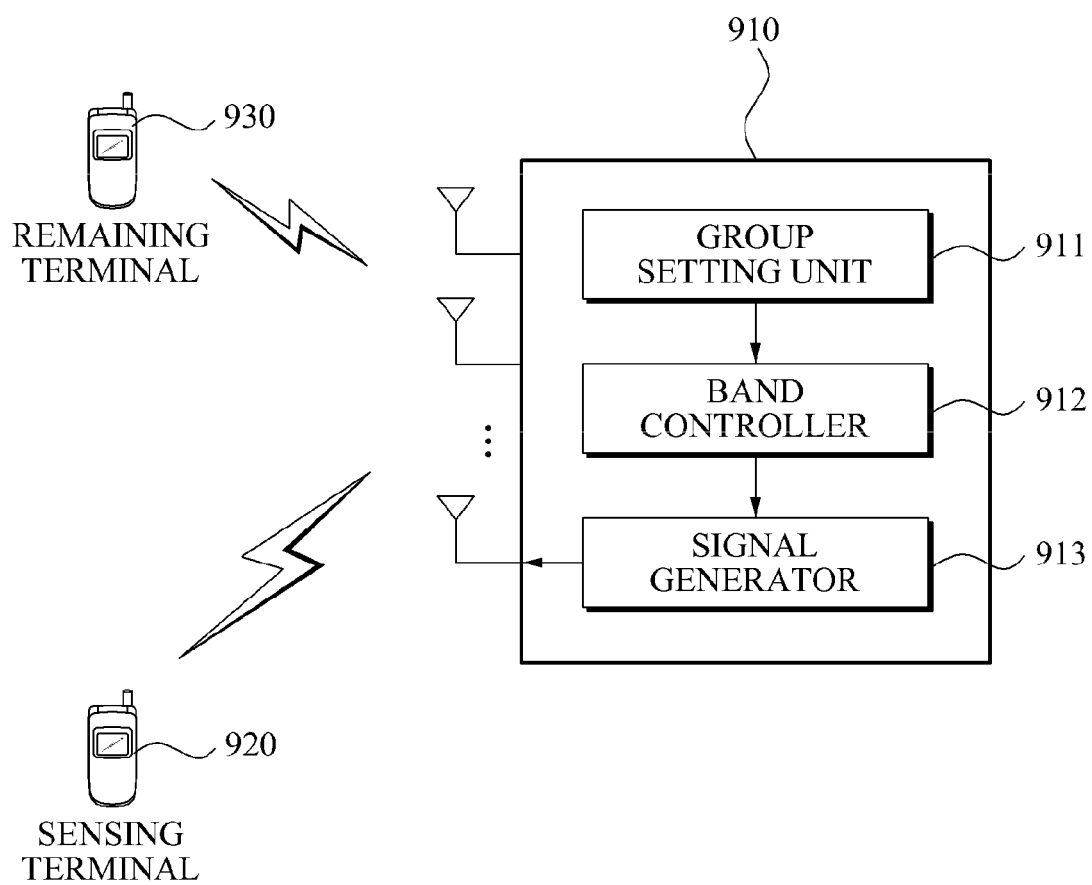
FIG. 9 is a diagram illustrating a cognitive radio base station, a sensing terminal, and a remaining terminal according to an exemplary embodiment.

FIG. 9 illustrates a cognitive radio base station 910, a sensing terminal 920, and a remaining terminal 930 according to an exemplary embodiment.

That is, FIG. 9 illustrates a cognitive radio communication system having the cognitive radio base station 910, the sensing terminal 920, and the remaining terminal 930 according to an exemplary embodiment.

The cognitive radio base station 910 may include a plurality of antennas.

A group setting unit 911 of the cognitive radio base station 910 may set at least one sensing terminal group that includes at least one sensing terminal among a plurality of terminals.

A band controller 912 of the cognitive radio base station 910 may adaptively control a downlink band and an uplink band so that a usage frequency band of a primary user may be included in the downlink band, in a frequency division duplex system that separately uses the downlink band and the uplink band.

A signal generator 913 of the cognitive radio base station 910 may generate a transmission signal and transmit the transmission signal using channels formed between the plurality of antennas and the plurality of terminals; so that a signal received by the at least one sensing terminal 920 may become null or near-null. The remaining terminal 930 may extract data from the transmission signal.

Since the signal received by the sensing terminal 920 is null or near-null, the sensing terminal 920 may perform a fine sensing regardless of whether the cognitive radio base station 910 transmits the transmission signal. This is because although the cognitive radio base station 910 transmits the transmission signal, the sensing terminal 920 may have a virtual sensing time.

The aforementioned cognitive radio base station or sensing terminal may operate in a downlink time interval. For example, where the cognitive radio base station transmits the transmission signal using the downlink time interval, the sensing terminal may have the entire or a portion of the downlink time interval as the virtual sensing time and perform a fine sensing using the virtual sensing time.

The cognitive radio base station or the sensing terminal may also operate in an uplink time interval, which will be described later. For example, a cognitive radio communication system according to an exemplary embodiment may appropriately determine uplink communication terminals for performing an uplink communication among a plurality of terminals, so that a sensing terminal may not be significantly interfered by other terminals.

Figure 10:
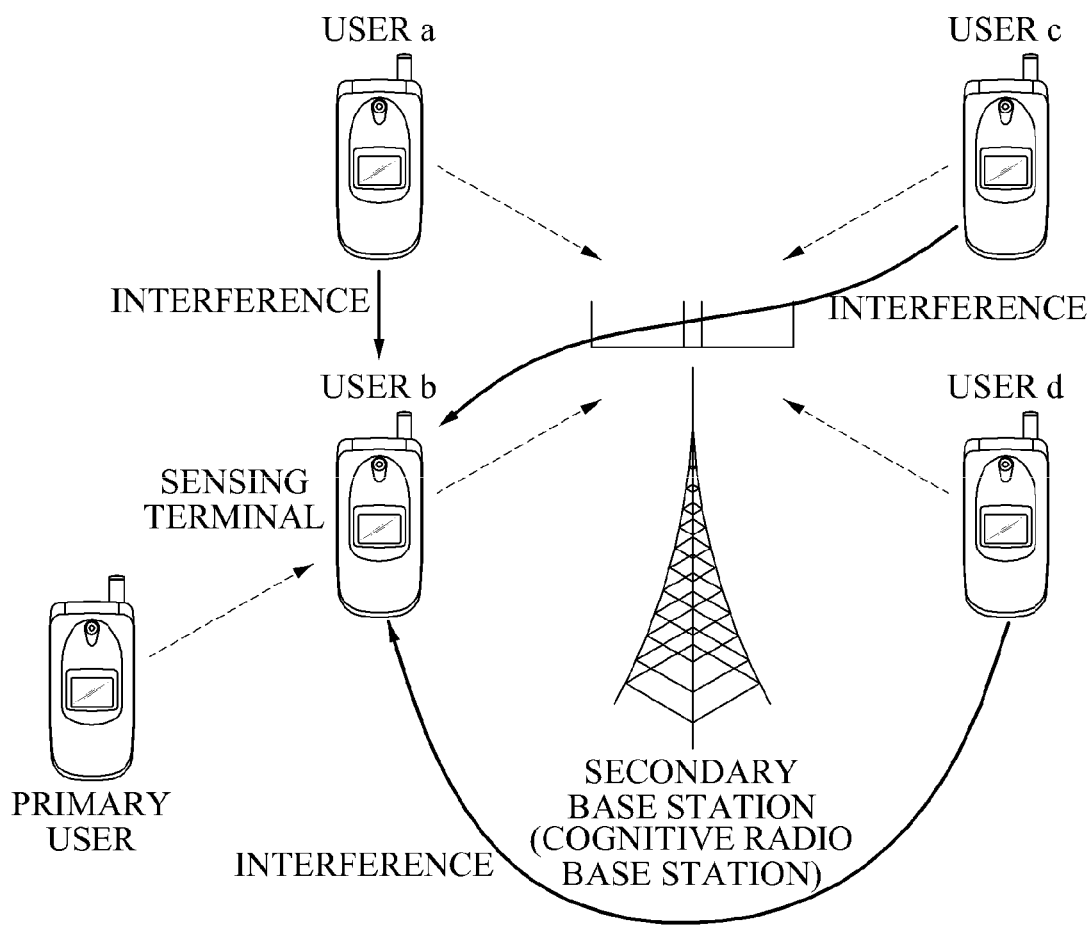
FIG. 10 is a diagram illustrating a cognitive radio communication system including a secondary base station that determines at least one uplink communication terminal among secondary terminals with respect to a sensing terminal according to an exemplary embodiment.

FIG. 10 illustrates a cognitive radio communication system including a secondary base station that determines at least one uplink communication terminal among secondary terminals (USERS a, c and d) with respect to a sensing terminal (USER b) according to an exemplary embodiment.

Referring to FIG. 10, the cognitive radio communication system includes the plurality of secondary terminals (USERS a, b, c, and d) and the secondary base station, that is, a cognitive radio base station. The secondary terminals (USERS a, b, c, and d) of the cognitive radio communication system may sense a signal of a primary user whereby the cognitive radio communication system may use radio resources allocated to a primary communication system.

Where the primary user approaches the USER b, the USER b may recognize the existence of the primary user. For example, the USER b may measure the energy or power of the signal of the primary user via a fast sensing scheme. The USER b may compare the measured energy or power with a predetermined sensing reference level to determine whether the primary user exists.

Where the USER b determines that the primary user exists, the USER b may report to the secondary base station about the result. The secondary base station may determine the USER b as a sensing terminal to perform a fine sensing.

Although not illustrated in FIG. 10, where other secondary terminals exist adjacent to a location of the USER b, in addition to the USER b, the secondary base station may determine the other secondary terminals as sensing terminals. The sensing terminals may be grouped into at least one sensing terminal group. The sensing terminals may be classified into a plurality of subsets that includes at least one sensing terminal. The at least one sensing terminal of the sensing terminal group may perform a fine sensing without performing an uplink communication during the entire or a portion of the uplink time interval.

Where the uplink communication is performed, interference may occur in the sensing terminal (USER b) due to the other secondary terminals (USERS a, c, and d). The interference occurring in the sensing terminal (USER b) caused by the other secondary terminals (USERS a, c and d) may need to be controlled so that the sensing terminal (USER b) may accurately perform the fine sensing for the signal of the primary user.

The cognitive radio base station may appropriately determine at least one uplink communication terminal performing an uplink communication among the secondary terminals (USERS a, c, and d), so that the sensing terminal (USER b) may appropriately perform the fine sensing.

For example, the cognitive radio base station may be aware of the location of the sensing terminal (USER b) and the locations of the secondary terminals (USERS a, c, and d) using, for example, a global positioning system (GPS) and the like. Using, for example, the GSP, the cognitive radio base station may determine the accurate locations of the USERS a, b, c, and d. The cognitive radio base station may predict the interference that may occur in the sensing terminal (USER b) due to the secondary terminals (USERS a, c, and d) and determine at least one uplink communication terminal based on the predicted interference. For example, the cognitive radio base station may determine the at least one uplink communication terminal based on the transmission power of the secondary terminals (USERS a, c, and d), the location of the sensing terminal (USER b), the locations of the secondary terminals (USERS a, c, and d), a tolerable threshold level of the interference, or a combination thereof.

Where the cognitive radio base station is aware of the accurate location of the sensing terminal (USER b) and the accurate locations of the secondary terminals (USERS a, c, and d), the cognitive radio base station may determine the uplink communication terminal to satisfy the following Equation 3:

$$\text{Max}_i(P_j/PL(d_{ij})) < \epsilon \quad (3),$$

where j denotes an index of the uplink communication terminal, i denotes an index of the sensing terminal or an index of a subset that includes the sensing terminal, $d_{ij}$ denotes a distance between $j^{th}$ the uplink communication terminal and the $i^{th}$ sensing terminal or $i^{th}$ the subset including the sensing terminal, $PL(d_{ij})$ denotes a path loss caused by $d_{ij}$, $P_j$ denotes the transmission power of the uplink communication terminal, and $\epsilon$ denotes the tolerable threshold of the interference occurring in the sensing terminal.

For example, the cognitive radio base station according to an exemplary embodiment may determine the $j^{th}$ uplink communication terminal satisfying the above Equation 3, among the plurality of terminals. Here, the $j^{th}$ uplink communication terminal may be a single terminal, or may be the $j^{th}$ subset that includes at least one uplink communication terminal.

The cognitive radio base station may be unaware of the accurate location of the sensing terminal (USER b) and the accurate locations of the secondary terminals (USERS a, c, and d). The cognitive radio base station may determine the at least one uplink communication terminal based on an approximate location of the sensing terminal (USER b) and approximate locations of the secondary terminals (USERS a, c, and d). In particular, the cognitive radio base station may determine, as the uplink communication terminal, a secondary terminal that exists in a sector separated away from a sector of the sensing terminal (USER b), among the secondary terminals (USERS a, c, and d). For example, the cognitive radio base station may determine, as the uplink communication terminal, a secondary terminal of a sector that exists in the opposite direction to the sector of the sensing terminal (USER b).

Here, it is assumed that the USERS c and d among the secondary terminals (USERS a, c, and d) are determined as uplink communication terminals. The cognitive radio base station may provide the secondary terminals (USERS a, c, and d) with information regarding that the USERS c and d among the secondary terminals (USERS a, c, and d) that are determined as the uplink communication terminals. Accordingly, in the uplink time interval, the USERS c and d may perform the uplink communication, whereas the USER a may not perform the uplink communication. The sensing terminal (USER b) may perform the fine sensing in the uplink time interval.

Figure 11:
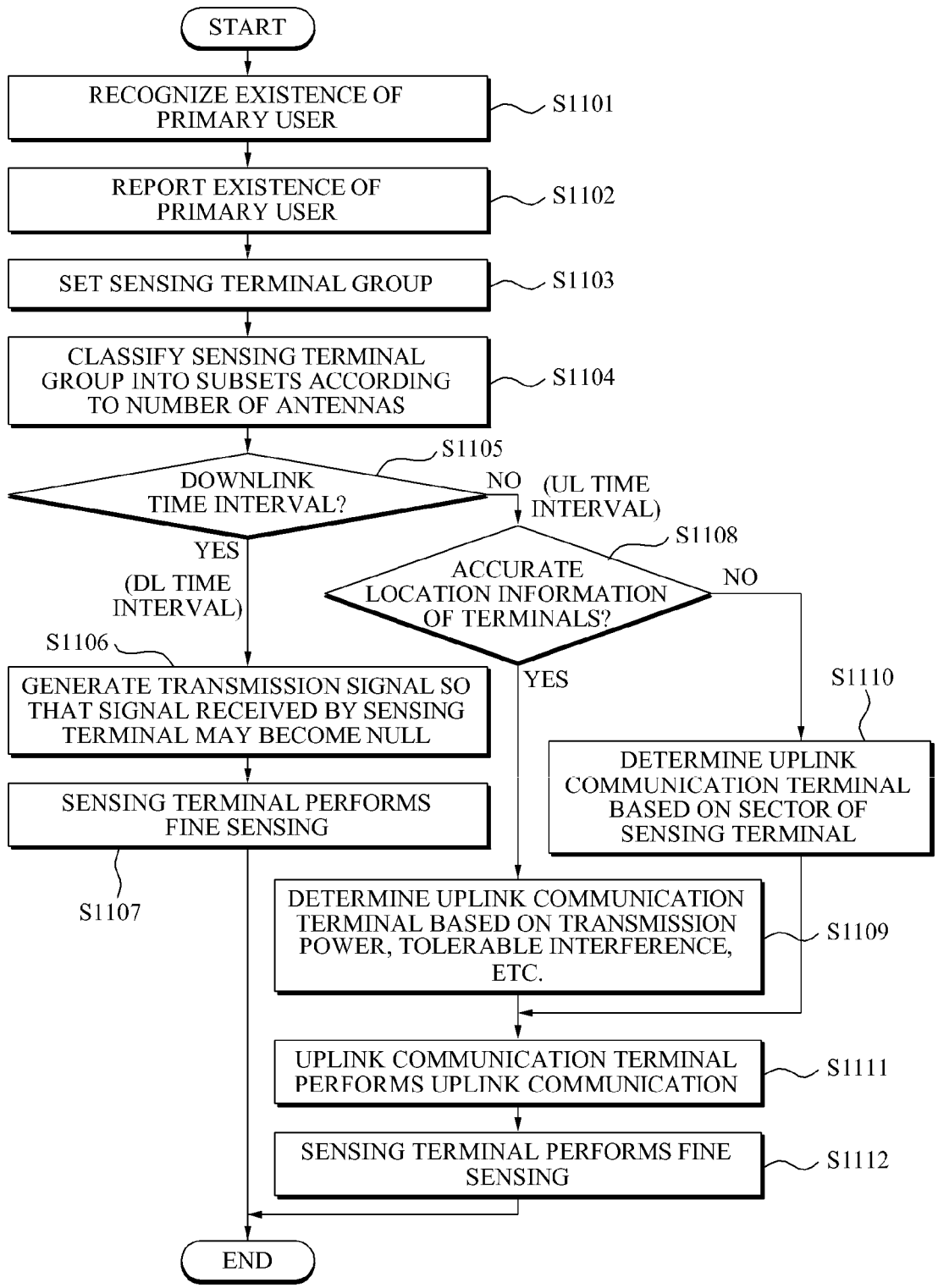
FIG. 11 is a flowchart illustrating an exemplary method of operating a cognitive radio communication system.

FIG. 11 illustrates an exemplary method of operating a cognitive radio system.

Referring to FIG. 1, in operation S1101, a terminal among a plurality of terminals, for example, secondary terminals, may recognize the existence of a primary user according to a fast sensing scheme.

In operation S1102, the terminal may report to a cognitive radio base station, for example, a secondary base station, about the existence of the primary user. Where a cognitive radio communication system is a frequency division duplex system, the terminal may report to the cognitive radio base station about the existence of the primary user, using an uplink band.

In operation S1103, the cognitive radio base station may set at least one sensing terminal or sensing terminal group performing a fine sensing based on a location of the terminal or a location of the primary user. Here, the sensing terminal group may include a plurality of subsets that include the at least one sensing terminal.

In operation S1104, where the sensing terminal group includes sensing terminals, the cognitive radio base station may classify the sensing terminals included in the sensing terminal group into the plurality of subsets. A number of subsets may be limited by a number of antennas installed in the cognitive radio base station.

In operation S1105, the cognitive radio base station may determine whether a sensing time where the sensing terminal may perform the fine sensing is included in a downlink time interval or in an uplink time interval.

For example, where the sensing time is included in the downlink time interval, the cognitive radio base station may generate the transmission signal so that the sensing terminal may have the sensing time. Where the sensing time is included in the uplink time interval, the cognitive radio base station may determine the uplink communication terminal among the plurality of terminals, so that the interference occurring in the sensing terminal may be decreased.

In operation S1106, where the sensing time is included in the downlink time interval, the cognitive radio base station may generate the transmission signal using a MIMO communication technology so that the signal received by the sensing terminal may become null. Here, since the sensing terminal does not practically receive any signal, the sensing terminal may have a virtual sensing time.

In operation S1107, the sensing terminal may perform the fine sensing using the virtual sensing time. Other terminals may receive the transmission signal and extract data from the transmission signal.

In operation S1108, where the sensing time is included in the uplink time interval, the cognitive radio base station may determine whether it is possible to obtain accurate location information of the terminals.

Where the cognitive radio base station may obtain the accurate location information, the cognitive radio base station may determine the uplink communication terminal performing the uplink communication among the plurality of terminals based on the transmission power of the terminals, a tolerable threshold of the interference occurring in the sensing terminal, and/or a distance between the terminals, in operation S1109.

Where the cognitive radio base station may not obtain the accurate location information of the terminals, the cognitive radio base station may determine the uplink communication terminal based on which sector the sensing terminal exists among a plurality of sectors of the cognitive radio base station, so that the interference occurring in the sensing terminal may be reduced. For example, among the plurality of terminals, a terminal belonging to a sector that exists in the opposite direction of the sector of the sensing terminal may be determined as the uplink communication terminal.

Where the uplink communication terminal is determined, the cognitive radio base station may provide the plurality of terminals with information associated with which terminal is determined as the uplink communication terminal.

In operation S1111, the uplink communication terminal may perform the uplink communication. Since the remaining terminals excluding the uplink communication terminal do not perform the uplink communication in the uplink time interval, the interference occurring in the sensing terminal may be reduced.

In operation S1112, the sensing terminal may perform the fine sensing in the uplink time interval. Since the interference occurring in the sensing terminal is reduced, the sensing terminal may accurately perform the fine sensing.

Figure 12:
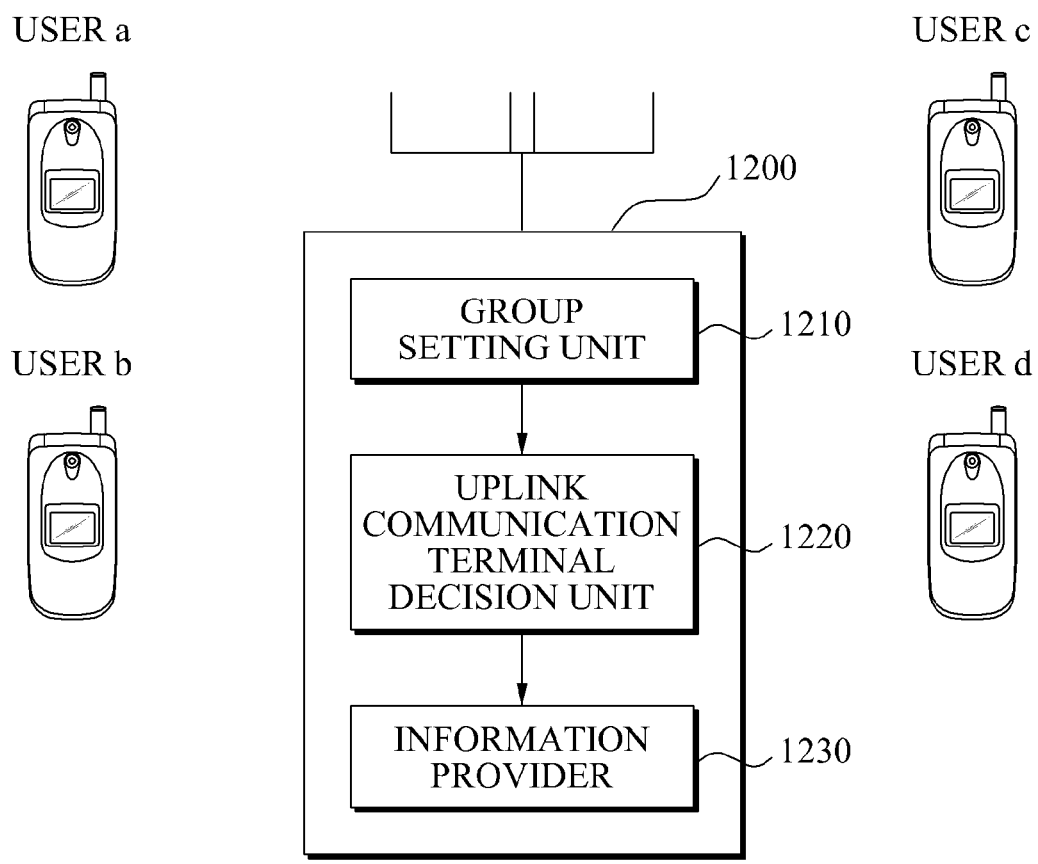
FIG. 12 is a block diagram illustrating an exemplary cognitive radio base station determining an uplink communication terminal.

FIG. 12 illustrates an exemplary cognitive radio base station 1200 that determine an uplink communication terminal.

Referring to FIG. 12, the cognitive radio base station 1200 includes a group setting unit 1210, an uplink communication terminal decision unit 1220, and an information provider 1230.

The group setting unit 1210 may set at least one sensing terminal group that includes at least one sensing terminal performing a fine sensing, among a plurality of terminals (USERS a, b, c, and d). For example, the group setting unit 1210 may set at least one sensing terminal group based on a distance between a primary user (not shown) and the plurality of terminals (USERS a, b, c, and d).

The uplink communication terminal decision unit 1220 may determine at least one uplink communication terminal performing an uplink communication, among the plurality of terminals (USERS a, b, c, and d), so that the at least one sensing terminal may have a sensing time in an uplink time interval.

For example, with the assumption that the USER b is determined as the sensing terminal, the uplink communication terminal decision unit 1220 may determine at least one uplink communication terminal among the USERS a, c, and d based on the interference occurring in the USER b due to the USERS a, c, and d. The uplink communication terminal decision unit 1220 may determine the uplink communication terminal based on the transmission power of the USERS a, c, and d, locations of the USERS a, b, c, and d, the tolerable threshold of the interference occurring in the USER b, and the like.

The information provider 1230 may provide the USERS a, c, and d with information associated with the uplink communication terminal, that is, the USER b. Depending on the provided information, the USERS a, c, and d may perform the uplink communication, or may not perform the uplink communication in the uplink time interval.

According to certain examples described above, a cognitive radio base station may generate a transmission signal so that a signal received by a sensing terminal may become null. Through this, the sensing terminal may sense a signal of a primary user while receiving the transmission signal. Accordingly, a separate sensing time or quiet time may not be required for the sensing terminal to sense the signal of the primary user, and thus, a capacity of a cognitive radio communication system may be improved.

Also, a cognitive radio base station and a sensing terminal may be applicable to a frequency division duplex system to improve a usage efficiency of radio resources.

The methods and operations described above including the exemplary cognition radio base station operating method may be recorded, or fixed in one or more computer-readable media that includes program instructions to be implemented by a computer to case a processor to execute or perform the program instructions. The media may also include, independent or in combination with the program instructions, data files, data structures, and the like. Examples of computer-readable media may include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and/or methods described above, or vice versa.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A cognitive radio base station comprising:
a plurality of antennas;
a setting unit configured to set a secondary terminal, from among a plurality of secondary terminals within a cell coverage of the cognitive radio base station, as a sensing terminal; and
a signal generator configured to generate a transmission signal and to transmit the transmission signal using channels formed between the plurality of antennas and the plurality of secondary terminals, the transmission signal providing a sensing time for the sensing terminal to sense a signal of a primary user and simultaneously providing data to at least one other secondary terminal while the sensing terminal and the at least one other secondary terminal are within the cell coverage, wherein the signal generator generates the transmission signal so that a signal received by the sensing terminal is null or near-null.

2. The cognitive radio base station of claim 1, wherein the plurality of antennas simultaneously transmits the transmission signal for the sensing terminal and the at least one other secondary terminal excluding the sensing terminal.

3. The cognitive radio base station of claim 1, wherein the setting unit recognizes the existence of a primary user and sets the sensing terminal, based on a location of the primary user.

4. The cognitive radio base station of claim 1, wherein the setting unit sets the sensing terminal based on a distance between a primary user and the plurality of secondary terminals.

5. The cognitive radio base station of claim 1, further comprising:
a band controller configured to adaptively control a downlink band and an uplink band so that a usage frequency band of the primary user may be included in the downlink band, in a cognitive radio communication system that adopts a frequency division duplex scheme separately using the downlink band and the uplink band, wherein
the sensing terminal senses a signal of the primary user using the controlled downlink band while simultaneously receiving the transmission signal from the cognitive radio base station.

6. The cognitive radio base station of claim 5, wherein the sensing terminal reports a sensing result regarding the signal of the primary user using the controlled uplink band.

7. The cognitive radio base station of claim 1, wherein:
at least one secondary terminal among the plurality of secondary terminals recognizes the existence of the primary user according to a fast sensing scheme, and
the setting unit receives information associated with the existence of the recognized primary user from the at least one secondary terminal among the plurality of secondary terminals.

8. The cognitive radio base station of claim 1, wherein the signal generator is configured to generate the transmission signal and to transmit the transmission signal such that the sensing terminal is accorded the sensing time during the transmission and at least one other secondary terminal is able to receive the transmission signal during the transmission.

9. The cognitive radio base station of claim 1, wherein the sensing terminal has a virtual sensing time and performs fine sensing using the virtual sensing time.

10. The cognitive radio base station of claim 9, wherein the signal received by the sensing terminal is null or near-null and the sensing terminal has the virtual sensing time.

11. A cognitive radio base station comprising:
a setting unit configured to set a secondary terminal, from among a plurality of secondary terminals within a cell coverage of the cognitive radio base station, as a sensing terminal; and
an uplink communication terminal decision unit configured to determine at least one uplink communication terminal to perform an uplink communication from among the plurality of secondary terminals, so that the sensing terminal is simultaneously accorded a sensing time to sense for a primary user during the uplink communication while the sensing terminal and the uplink connection terminal are within the cell coverage, wherein
the cognitive radio base station generates a transmission signal so that a signal received by the sensing terminal is null or near-null.

12. The cognitive radio base station of claim 11, wherein the uplink communication terminal decision unit determines the at least one uplink communication terminal based on at least one of a transmission power of the plurality of secondary terminals, a location of the sensing terminal, locations of the plurality of secondary terminals, and a tolerable threshold of interference occurring in the sensing terminal due to the plurality of secondary terminals.

13. The cognitive radio base station of claim 11, wherein the uplink communication terminal decision unit determines the at least one uplink communication terminal based on interference occurring in the sensing terminal due to the at least one uplink communication terminal.

14. The cognitive radio base station of claim 11, wherein the setting unit sets the sensing terminal based on a distance between a primary user and the plurality of secondary terminals.

15. The cognitive radio base station of claim 14, wherein:
at least one terminal among the plurality of secondary terminals recognizes the existence of the primary user according to a fast sensing scheme, and
the setting unit sets the sensing terminal based on information associated with the existence of the primary user.

16. The cognitive radio base station of claim 15, wherein the remaining secondary terminals excluding the determined at least one uplink communication terminal among the plurality of secondary terminals do not perform the uplink communication in the uplink time interval, based on information associated with the determined at least one uplink communication terminal.

17. The cognitive radio base station of claim 11, further comprising:
an information provider configured to provide the plurality of secondary terminals with information associated with the determined at least one uplink communication terminal.

18. A method of a sensing terminal from among a plurality of secondary terminals within a cell of a cognitive radio base station, the method comprising:
recognizing by the sensing terminal the existence of a primary user according to a fast sensing scheme and reporting to the cognitive radio base station information associated with the existence of the primary user; and
sensing by the sensing terminal a signal of the primary user while receiving a transmission signal from the cognitive radio base station, wherein:
the transmission signal is transmitted by the cognitive radio base station via a plurality of antennas, and the transmission signal provides a sensing time for the sensing terminal to sense a signal of the primary user and simultaneously provides data to at least one other secondary terminal while the sensing terminal and the at least one other secondary terminal are within the cell coverage, and
the transmission signal is generated so that a signal received by the sensing terminal is null or near-null.

19. The method of claim 18, wherein the cognitive radio base station transmits the transmission signal, so that a signal received by the sensing terminal is null or near-null, and at least one remaining terminal excluding the sensing terminal among the plurality of secondary cognitive radio terminals receives data.

20. The method of claim 18, wherein the sensing comprises sensing the signal of the primary user according to a fine sensing scheme.

21. The method of claim 18, wherein the sensing terminal is accorded a sensing time directly by the base station.

22. A method of a cognitive radio base station, the method comprising:
   setting by the cognitive radio base station a secondary terminal, from among a plurality of secondary terminals within a cell coverage of the cognitive radio base station, as a sensing terminal;
   generating by the cognitive radio base station a transmission signal to be transmitted between a plurality of antennas and the plurality of secondary terminals, the transmission signal providing a sensing time during the transmission of the transmission signal to the sensing terminal to sense a primary user on the frequency band while simultaneously provides data to at least one other secondary terminal within the cell coverage; and
   transmitting by the cognitive radio base station the transmission signal to the plurality of secondary terminals via the plurality of antennas while the sensing terminal and the at least one other secondary terminal are within the cell coverage, wherein
   the cognitive radio base station generates the transmission signal so that a signal received by the sensing terminal is null or near-null.

23. The method of claim 22, wherein:
   the generating comprises generating the transmission signal so that a signal received by the sensing terminal is null or near-null and at least one remaining secondary terminal excluding the sensing terminal receives data, and
   the transmitting comprises transmitting the transmission signal to the sensing terminal and the at least one remaining secondary terminal.

24. The method of claim 22, wherein the sensing terminal senses a signal of a primary user while receiving the transmission signal.

25. A method of a cognitive radio base station, the method comprising:
   setting by the cognitive radio base station a secondary terminal, from among a plurality of secondary terminals within a cell coverage of the cognitive radio base station, as a sensing terminal; and
   determining by the cognitive radio base station at least one uplink communication terminal configured to perform an uplink communication from among the plurality of secondary terminals, so that the sensing terminal is simultaneously accorded a sensing time to sense for a primary user during the uplink communication while the sensing terminal and the uplink connection terminal are within the cell coverage, wherein
   the cognitive radio base station generates a transmission signal so that a signal received by the sensing terminal is null or near-null.

26. The method of claim 25, wherein the determining comprises determining the at least one uplink communication terminal based on at least one of a transmission power of the secondary terminals, a location of the sensing terminal, locations of the secondary terminals, and a tolerable threshold of interference occurring in the sensing terminal due to the plurality of secondary terminals.

27. A non-transitory computer-readable storage medium storing a program to operate a sensing terminal from among a plurality of secondary terminals within a cell coverage of a cognitive radio base station, comprising instructions to cause the sensing terminal to:
   recognize the existence of a primary user according to a fast sensing scheme and reporting to the cognitive radio base station information associated with the existence of the primary user; and
   sense a signal of the primary user while receiving a transmission signal from the cognitive radio base station, wherein:
   the cognitive radio base station transmits the transmission signal via a plurality of antennas, and the transmission signal provides a sensing time for the sensing terminal to sense a signal of the primary user and simultaneously provides data to at least one other secondary terminal while the sensing terminal and the at least one other secondary terminal are within the cell coverage, and
   the cognitive radio base station generates the transmission signal so that a signal received by the sensing terminal is null or near-null.

* * * * *